Patented Sept. 7, 1926.

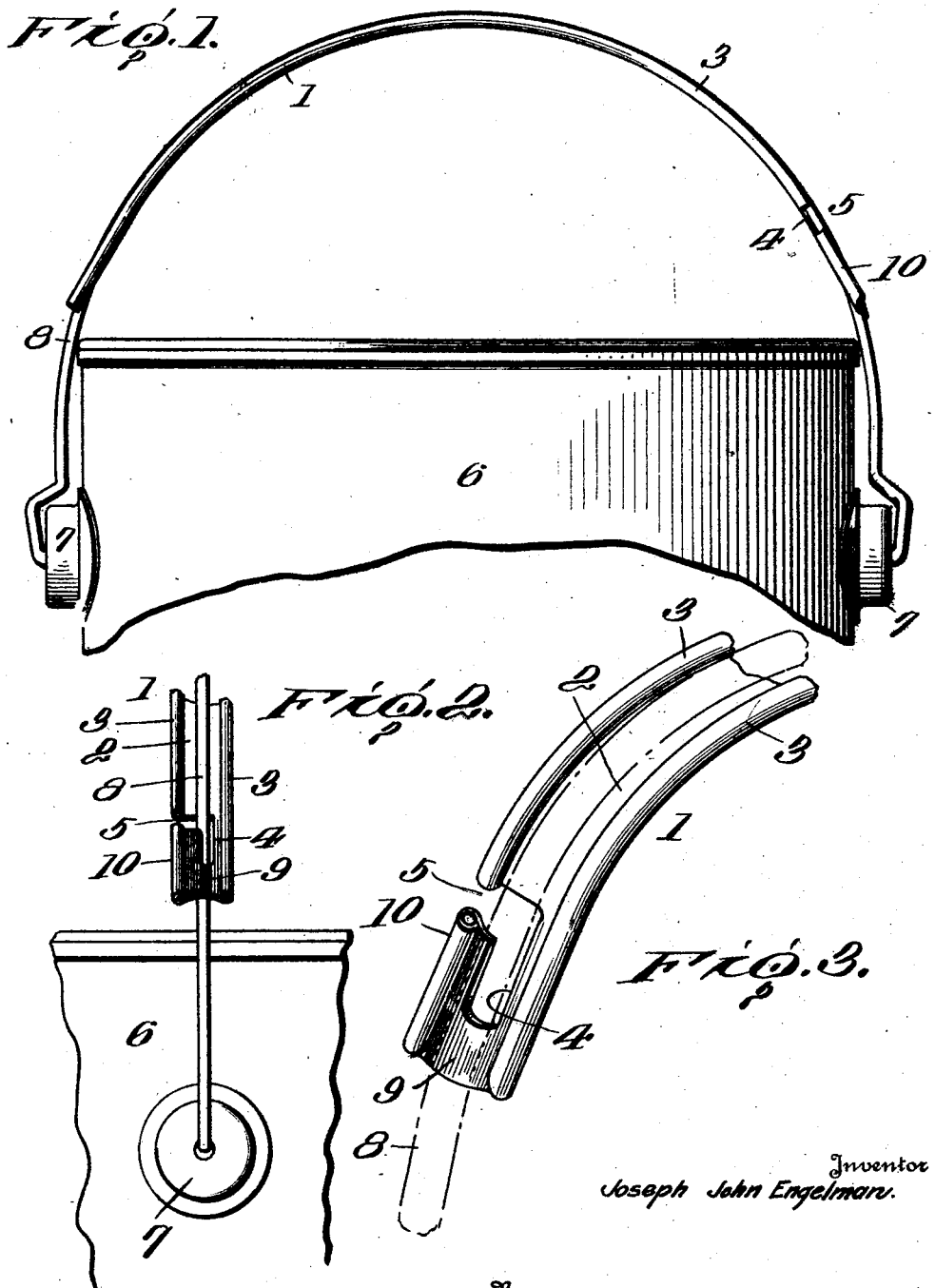

1,599,222

UNITED STATES PATENT OFFICE.

JOSEPH JOHN ENGELMAN, OF CHICAGO, ILLINOIS, ASSIGNOR TO CONTINENTAL CAN COMPANY, INC., OF NEW YORK, N. Y., A CORPORATION OF NEW YORK.

HANDLE FOR CONTAINER BAILS.

Application filed April 28, 1926. Serial No. 105,299.

The invention relates to new and useful improvements in handles for container bails, and more particularly to a handle which may be connected to or disconnected from the bail after the bail is attached to the container.

An object of the invention is to provide a handle having rolled beads along the side edges thereof for strengthening the handle and protecting the hand of the carrier, which handle is also provided with slots adjacent the ends thereof leading to the side edges of the handle so that the bail may be inserted into the slot and thus the handle attached to the bail.

In the drawings which show by way of illustration one embodiment of the invention—

Figure 1 is an edge view of a handle embodying the improvements, showing the handle applied to the bail of the container;

Fig. 2 is a detail view of one end of the handle and showing the same applied to the bail of the container, and Fig. 3 is a perspective view of one end of the handle, and showing in dotted lines the bail as connected thereto.

In the carrying out of the invention, a metal blank is provided having the side edges thereof substantially parallel, and the edge portions are rolled to form protecting and strengthening beads for the handle. The handle is curved intermediate the ends thereof to conform to the curvature of the bail. Adjacent each end of the handle there is a longitudinal slot and a transverse slot leads from the side edge of the handle into the longitudinal slot. The metal at the end of the handle is curved so as to conform to and overlie the bail of the container. The bail of the container is inserted through the slots and overlies the handle intermediate the slots, then passes through the slots and the handle itself overlies the bail at the ends.

Referring more in detail to the drawings, the improved handle is indicated at 1 and consists of a blank of sheet metal 2, the side edges of which are substantially parallel, and the edge portions are rolled to form hollow beads 3, 3. These beads are spaced from each other and are for the purpose of protecting the hand of the one carrying the container, and also for the purpose of strengthening the handle. Adjacent each end of the bail, there is a longitudinal slot 4. This longitudinal slot is located between the beads 3, 3, and is of slightly greater width than the diameter of the bail. Leading into the longitudinal slot is a transverse slot 5. This transverse slot cuts through the hollow bead 3, thus forming an open slot through which the bail may be inserted into the longitudinal slot. The container proper is indicated at 6 in the drawings, and this container is provided with suitable ears 7, 7. A wire bail 8 engages the ears. The metal at the ends 9 of the handle, is curved so as to overlie and conform to the bail. The handle is curved to conform to the curvature of the bail, and the bail is inserted through these transverse slots 5 into the longitudinal slots 4. The bail underlies the curved portion 9 of the handle, and extends over the handle between the longitudinal slots 4. When the handle is grasped, it is raised against the bail, and thus the container is carried.

My improved handle makes a very easy and comfortable support for containers having wire bails in which heavy materials are packed, such as paint or the like. The bail is first attached to the container, and then the handle is attached to the bail. If necessary, the portion indicated at 10 in the drawings, of the handle, may be bent slightly to aid in the placing of the handle on the bail, after which this portion of the handle is bent back into normal position. This handle is preferably made of tin, and the parts 10 may readily be bent by hand.

It is obvious that minor changes in the details of construction may be made without departing from the spirit of the invention as set forth in the appended claim.

Having thus described the invention, what

I claim as new and desire to secure by Letters-Patent, is—

A handle for container bails comprising a sheet metal blank curved to conform to the curvature of the bail, and having the side edge portions thereof rolled to form protecting and strengthening beads, said blank being provided with longitudinal slots disposed adjacent the ends of the handle, said blank at the ends of the slots being curved so as to overlie said bail, said blank being provided with transverse slots leading from one edge of the blank into the respective longitudinal slots whereby said bail can be inserted through said transverse slots into said longitudinal slots and placed so as to extend over said handle intermediate the ends thereof and extend under said handle at the extreme ends thereof.

In testimony whereof, I affix my signature.

JOSEPH JOHN ENGELMAN.